(12) United States Patent
Kamijo et al.

(10) Patent No.: US 7,485,274 B2
(45) Date of Patent: Feb. 3, 2009

(54) APPARATUS AND METHOD FOR $CO_2$ RECOVERY

(75) Inventors: Takashi Kamijo, Hiroshima (JP); Masaki Iijima, Hiroshima (JP); Tomio Mimura, Osaka (JP); Yasuyuki Yagi, Osaka (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 378 days.

(21) Appl. No.: 11/359,523

(22) Filed: Feb. 23, 2006

(65) Prior Publication Data

US 2006/0204425 A1 Sep. 14, 2006

(30) Foreign Application Priority Data

Feb. 23, 2005 (JP) ............................. 2005-047857

(51) Int. Cl.
*B01D 53/62* (2006.01)
*B01D 53/78* (2006.01)

(52) U.S. Cl. ..................... 423/220; 422/168; 422/187

(58) Field of Classification Search ................ 423/220; 422/168, 187
See application file for complete search history.

(56) References Cited

U.S. PATENT DOCUMENTS 4,248,608 A * 2/1981 Giammarco et al. .......... 95/158

4,797,141 A 1/1989 Merader et al.
6,800,120 B1 * 10/2004 Won et al. ...................... 96/234
2006/0032377 A1 * 2/2006 Reddy et al. .................. 96/234

FOREIGN PATENT DOCUMENTS

JP 3-97613 A 4/1991
JP 3-193116 A 8/1991

OTHER PUBLICATIONS

Chu et al., Nexant, Internet (2004).
Sundset et al., CO2 Capture Project, Internet, pp. 1-14 (2004).
Jimeniez et al., "Simulation Based Optimization Of A Diabatic Distillation Column" (2003).
Mann et al., ETDS, Internet, (1999).

* cited by examiner

*Primary Examiner*—Timothy C Vanoy
(74) *Attorney, Agent, or Firm*—Birch, Stewart, Kolasch & Birch, LLP (57) ABSTRACT

An apparatus and a method for recovering $CO_2$ are provided in which an energy efficiency is improved. The apparatus for recovering $CO_2$ includes a flow path for returning extracted, temperature risen semi-lean solution into a regeneration tower wherein at least a part of the semi-lean solution obtained by removing a partial $CO_2$ from a rich solution infused in a regeneration tower from an upper part of the regeneration tower is extracted, raised its temperature by heat exchanging with a high-temperature waste gas in a gas duct of an industrial facility such as a boiler, and then returned into the regeneration tower.

8 Claims, 7 Drawing Sheets

APPARATUS AND METHOD FOR $CO_2$ RECOVERY

CROSS-REFERENCE TO RELATED APPLICATIONS

This application is based upon and claims the benefit of priority from Japanese Patent Application No. 2005-047857, filed Feb. 23, 2005, the entire contents of which are incorporated herein by reference.

BACKGROUND OF THE INVENTION

1. Field of the Invention

The present invention relates to an apparatus and a method for $CO_2$ recovery suitable for removing and recovering $CO_2$ included in $CO_2$-containing gas such as combustion waste gas, and more particularly relates to an apparatus and a method for $CO_2$ recovery, in which $CO_2$ included in $CO_2$-containing gas is removed/recovered with improved energy efficiency.

2. Description of the Related Art

Recently, a greenhouse effect owing to $CO_2$ has been pointed out as one of causes for global warming, and its measure has been internationally urgent in terms of preserving global environment. $CO_2$ emission sources cover all activity fields of human beings who burn fossil fuels, and a requirement for its emission limitation is prone to further increase. Along with this, methods in which $CO_2$ in combustion waste gas is removed and recovered by contacting the combustion waste gas from industrial facilities such as boilers and gas turbines with an amine based $CO_2$ absorbing solution, and methods in which the recovered $CO_2$ is stored without emitting in atmosphere have been actively studied for dynamogenesis facilities such as thermal power plants using the fossil fuels in a large amount. As a step of removing and recovering $CO_2$ from the combustion waste gas using the $CO_2$ absorbing solution as described above, those in which the combustion waste gas is contacted with the $CO_2$ absorbing solution in an absorption tower, and the $CO_2$ absorbing solution which has absorbed $CO_2$ is heated in a regeneration tower to liberate $CO_2$ as well as regenerate the $CO_2$ absorbing solution, which is then reused by circulating it to the absorption tower again have been employed (e.g., see Japanese Patent Laid-Open No. 3-193116).

Figure 7:
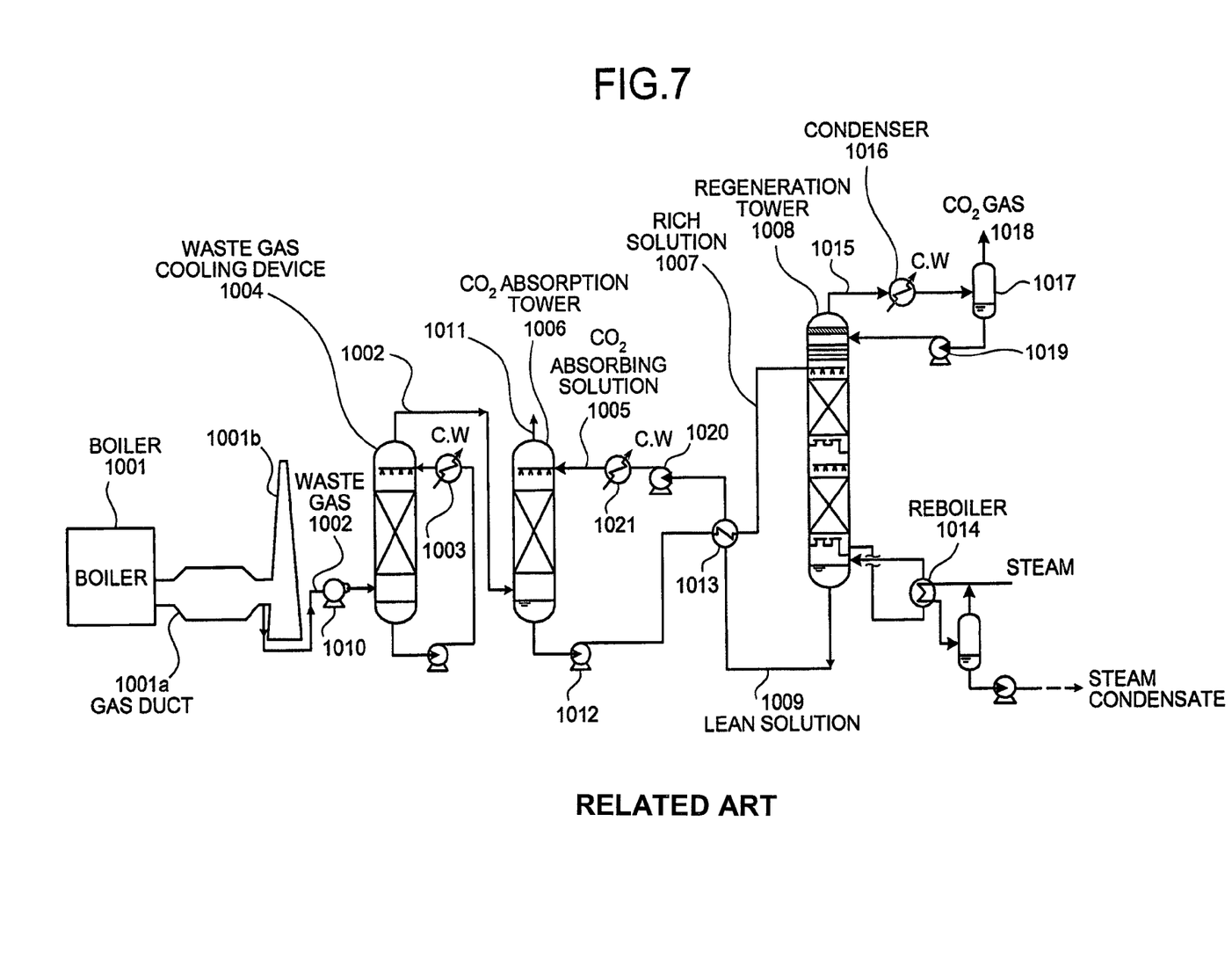
FIG. 7 is a schematic view of a conventional $CO_2$ recovery apparatus.

As shown in FIG. 7, the conventional $CO_2$ recovery apparatus has a waste gas cooling device 1004 which cools waste gas 1002 containing $CO_2$ discharged from the industrial facility such as a boiler and a gas turbine with cooling water 1003, a $CO_2$ absorption tower 1006 in which the cooled waste gas 1002 containing $CO_2$ is contacted with a $CO_2$ absorbing solution 1005 which absorbs $CO_2$ to remove $CO_2$ from the waste gas 1002, and a regeneration tower 1008 in which $CO_2$ is released from the $CO_2$ absorbing solution (rich solution) 1007 which has absorbed $CO_2$ to regenerate the $CO_2$ absorbing solution. In this apparatus, the regenerated $CO_2$ absorbing solution (lean solution) 1009 obtained by removing $CO_2$ in the regeneration tower 1008 is reutilized as the $CO_2$ absorbing solution in the absorption tower 1006.

In the method for recovering $CO_2$ using this conventional $CO_2$ recovery apparatus, first, pressure of the combustion waste gas 1002 containing $CO_2$ from the industrial facilities such as boilers and gas turbines is increased by a waste gas air blower 1010, subsequently the waste gas is transferred to the waste gas cooling device 1004, cooled here with cooling water 1003, and then transferred to the $CO_2$ absorption tower 1006.

In the $CO_2$ absorption tower 1006, the waste gas 1002 is countercurrently contacted with the $CO_2$ absorbing solution 1005 in which alkanolamine is a base, $CO_2$ in the waste gas 1002 is absorbed into the $CO_2$ absorbing solution 1005 by a chemical reaction ($R-NH_2+H_2O+CO_2 \rightarrow R-NH_3HCO_3$), and the waste gas 1011 in which $CO_2$ has been removed is discharged out of the system. The $CO_2$ absorbing solution 1007 which has been absorbed $CO_2$ is also referred to as a rich solution. The pressure of this rich solution 1007 is increased by a rich solvent pump 1012, and the rich solution is heated at a rich/lean solvents heat exchanger 1013 by the $CO_2$ absorbing solution 1009 (lean solution) regenerated by removing $CO_2$ in the regeneration tower 1008 described below and supplied to the regeneration tower 1008.

The rich solution 1007 infused inside the regeneration tower 1008 from an upper part of the regeneration tower 1008 releases the majority of $CO_2$ by causing an exothermic reaction. The $CO_2$ absorbing solution which has been released a part or majority of $CO_2$ in the regeneration tower 1008 is referred to as a semi-lean solution. This semi-lean solution becomes the $CO_2$ absorbing solution in which almost all $CO_2$ has been removed until reaching a bottom of the regeneration tower 1008. This absorbing solution regenerated by removing almost all $CO_2$ is referred to as a lean solution. This lean solution is heated with steam at a reboiler 1014. Meanwhile, the $CO_2$ gas with water vapor released from the rich solution and the semi-lean solution in the tower is derived from a top part in the regeneration tower 1008, the water vapor is condensed by an overhead condenser 1016, water is separated by a separation drum 1017, and the $CO_2$ gas 1018 is released out of the system and recovered. The water separated at the separation drum 1017 is supplied to the upper part of the regeneration tower 1008 by a condensed water circulation pump 1019. The regenerated $CO_2$ absorbing solution (lean solution) 1009 is cooled with the rich solution 1007 at the rich/lean solvent heat exchanger 1013, subsequently its pressure is increased by a lean solvent pump 1020, and the lean solution is cooled at a lean solvent cooler 1021 and then supplied to the $CO_2$ absorption tower 1006.

In FIG. 7, a numeral 1001a indicates a gas duct of the industrial facilities such as a boiler and a gas turbine and 1001b indicates a smokestack. The above $CO_2$ recovery apparatus may be installed later for recovering $CO_2$ from the waste gas source already disposed, or may be simultaneously annexed to the waste gas source newly disposed. An openable and closable cover is disposed at the smokestack 1001b, and set to close when the $CO_2$ recovery apparatus is operated and open when the operation of the $CO_2$ recovery apparatus is stopped even if a waste gas source is operated.

In the method for recovering $CO_2$ from the $CO_2$—containing gas such as combustion waste gas using the $CO_2$ absorbing solution and the $CO_2$ absorption step, it is necessary to reduce operation cost of the $CO_2$ recovery apparatus itself as possible because the $CO_2$ recovery apparatus is additionally installed to a combustion facility. In particular, in the above method for recovering $CO_2$, it is important to develop a process which enables a reduction of consumed energy in the regeneration step because this regeneration step using the regeneration tower consumes much thermal energy.

SUMMARY OF THE INVENTION

The present invention has been made in the light of the above circumstance, and aims at providing an apparatus and a method for recovering $CO_2$ in which energy efficiency is further enhanced.

A $CO_2$ recovery apparatus according to one aspect of the present invention includes a $CO_2$ absorption tower for removing $CO_2$ from a waste gas containing $CO_2$ discharged from industrial facilities by contacting the waste gas with a $CO_2$ absorbing solution for absorbing $CO_2$, a regeneration tower for regenerating a rich solution which is a $CO_2$ absorbing solution and absorbed $CO_2$ into a lean solution which is a $CO_2$ absorbing solution and absorbed no $CO_2$ by removing $CO_2$ from the rich solution, wherein the lean solution obtained by removing $CO_2$ in a regeneration tower is reutilized as a $CO_2$ absorbing solution in an absorption tower, and a flow path for returning extracted, temperature risen semi-lean solution to the regeneration tower wherein at least a part of the semi-lean solution obtained by removing a partial $CO_2$ from the rich solution infused in the regeneration tower from an upper part of the regeneration tower is extracted, raised its temperature by heat exchanging with a high-temperature waste gas in a gas duct of the industrial facility such as a boiler, and then returned to the regeneration tower. In the present invention, the industrial facility means a facility accompanying combustion such as a boiler and gas turbine.

A $CO_2$ recovery apparatus according to another aspect of the present invention, wherein a return position of the flow path for returning extracted, temperature risen semi-lean solution is set below a position for extracting the semi-lean solution in the regeneration tower.

A $CO_2$ recovery apparatus according to still another aspect of the present invention, wherein a position for extracting the semi-lean solution in the regeneration tower is an optional position between a position close to the infusion position of the rich solution and a middle stage of the regeneration tower.

A $CO_2$ recovery apparatus according to still another aspect of the present invention, wherein multiple positions for extracting the semi-lean solution are provided in the regeneration tower, and a return position of the extracted semi-lean solutions to the regeneration tower after heat exchanged with the waste gas is one position or multiple positions equal to or less than a number of the positions for extracting.

A $CO_2$ recovery apparatus according to still another aspect of the present invention includes a $CO_2$ absorption tower for absorbing $CO_2$ into a $CO_2$ absorbing solution by contacting the $CO_2$ absorbing solution with combustion waste gas extracted from a gas duct, a regeneration tower for removing $CO_2$ from the $CO_2$ absorbing solution by heating the $CO_2$ absorbing solution, a waste gas heat exchange section provided in the gas duct, an outward line of an extracted semi-lean solution for extracting the $CO_2$ absorbing solution from the regeneration tower and transferring it to the waste gas heat exchange section, and a return line of the extracted semi-lean solution for transferring the $CO_2$ absorbing solution from the waste gas heat exchange section to the regeneration tower, wherein a heat of the combustion waste gas is utilized by heat exchanging the $CO_2$ absorbing solution with the combustion waste gas in the waste gas heat exchange section when a lean solution is made by removing $CO_2$ from a rich solution which is the $CO_2$ absorbing solution and absorbed $CO_2$.

A method for recovering $CO_2$ according to still another aspect of the present invention includes the steps of removing $CO_2$ from a waste gas containing $CO_2$ discharged from industrial facilities by contacting the waste gas with a $CO_2$ absorbing solution in a $CO_2$ absorption tower, regenerating a rich solution which is the $CO_2$ absorbing solution and absorbed $CO_2$ into a lean solution which is the $CO_2$ absorbing solution and absorbed no $CO_2$ by introducing the rich solution into a regeneration tower and removing $CO_2$ from the rich solution, thereby reutilizing the lean solution as the $CO_2$ absorbing solution in the absorption tower, extracting at least a part of a semi-lean solution obtained by removing a part or a majority of $CO_2$ from the rich solution infused into the regeneration tower from an upper part of the regeneration tower, raising a temperature of the semi-lean solution by heat exchanging with a high-temperature waste gas in a gas duct of the industrial facility such as a boiler and a gas turbine, and returning the semi-lean solution into the regeneration tower at a position below a position for extracting the semi-lean solution in the regeneration tower.

A method for recovering $CO_2$ according to still another aspect of the present invention, wherein the semi-lean solution is extracted at an optional position between a position close to the infusion position of the rich solution and a middle stage of the regeneration tower.

A method for recovering $CO_2$ according to still another aspect of the present invention, wherein the semi-lean solution is extracted at multiple positions in the regeneration tower, the semi-lean solutions extracted at multiple positions are heat exchanged with the waste gas, and then these solutions are returned to one position or multiple positions equal to or less than a number of the positions for extracting in the regeneration tower.

The present invention is characterized in that a temperature profile in the regeneration tower is boosted by extracting at least a part of the semi-lean solution obtained by releasing a part or majority of $CO_2$ from the rich solution infused into the regeneration tower at the upper part of the regeneration tower, raising the temperature of the extracted semi-lean solution by performing the heat exchange with high temperature waste gas in the gas duct of the industrial facility such as boilers and gas turbines, and subsequently returning the semi-lean solution into the regeneration tower at the position below the position for extracting the semi-lean solution in the regeneration tower. That is, in the apparatus and the method for recovering $CO_2$ of the present invention, remaining heat of the waste gas is effectively utilized and the temperature in the regeneration tower is raised to enhance the regeneration efficiency, thereby being able to realize still more energy saving in the recovery system of $CO_2$.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Examples of the present invention will be described below in detail based on the drawings. The examples do not limit the invention.

EXAMPLE 1

Figure 1:
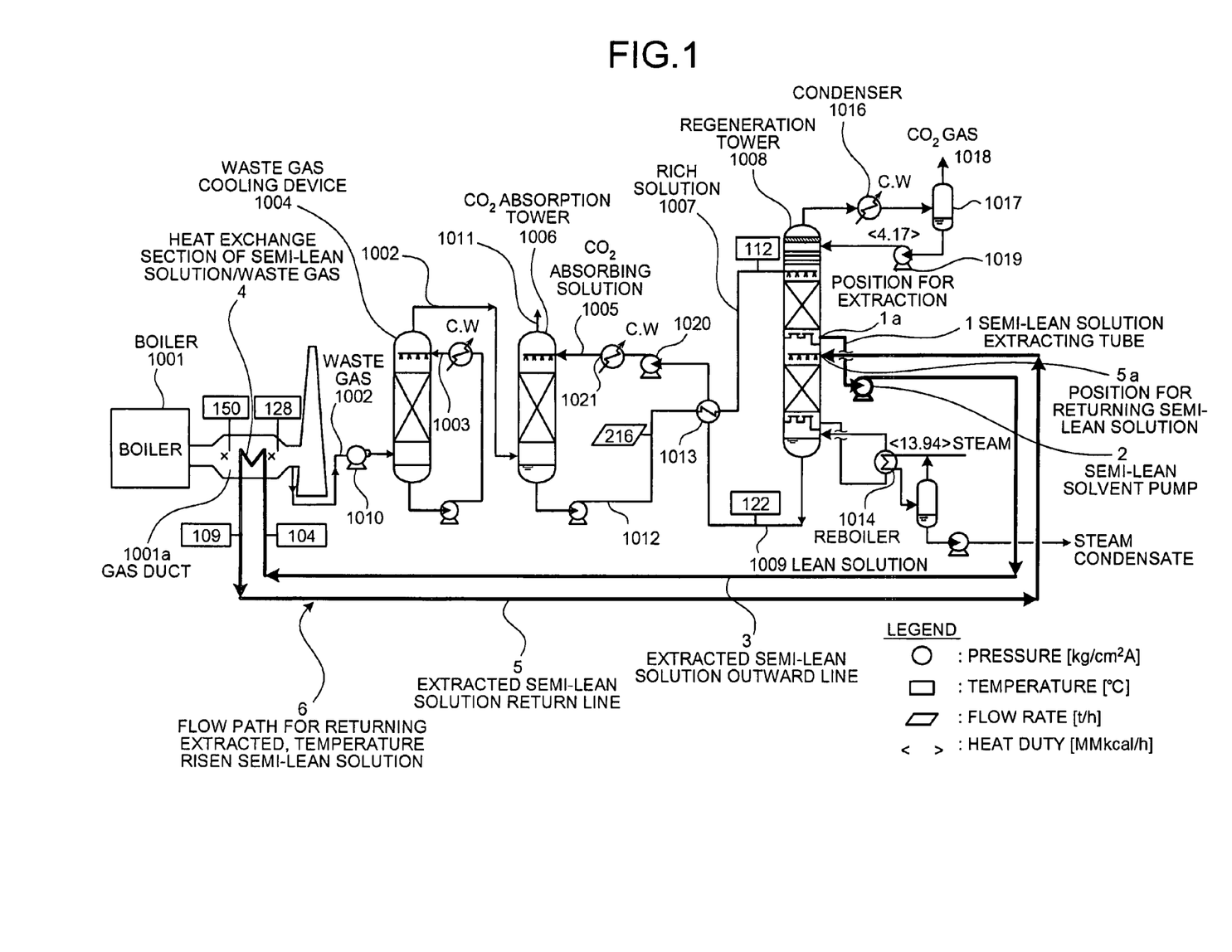
FIG. 1 is a schematic view of a $CO_2$ recovery apparatus according to Example 1 of the present invention.

FIG. 1 is a schematic view of a $CO_2$ recovery apparatus in Example 1 according to the present invention. In the figure, the illustration is simplified by giving the same letter and numeral to the same configuration as in the above FIG. 7.

As described above, the present invention is characterized in that the temperature profile in the regeneration tower is boosted by extracting at least a part of the semi-lean solution obtained by releasing a part or majority of $CO_2$ from the rich solution 1007 infused into the regeneration tower 1008 at the upper part of the regeneration tower 1008, raising the temperature of the extracted semi-lean solution by performing the heat exchange with high temperature waste gas in the gas duct 1001a of the industrial facility 1001 such as boilers and gas turbines, and subsequently returning the semi-lean solution into the regeneration tower 1008 at the position below the position for extracting the semi-lean solution in the regeneration tower 1008.

Figure 3:
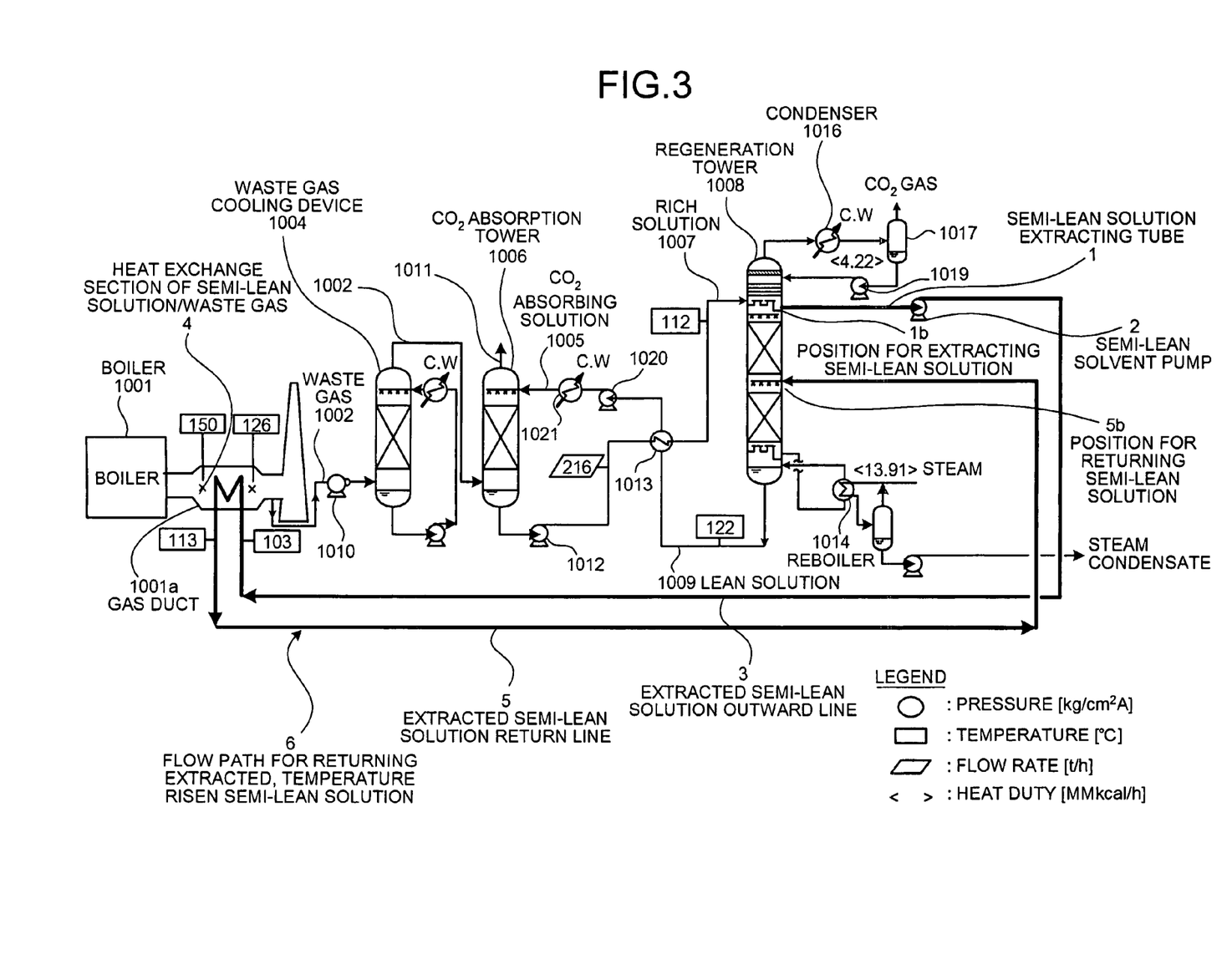
FIG. 3 is a schematic view of a $CO_2$ recovery apparatus according to Example 2 of the present invention.
Figure 5:
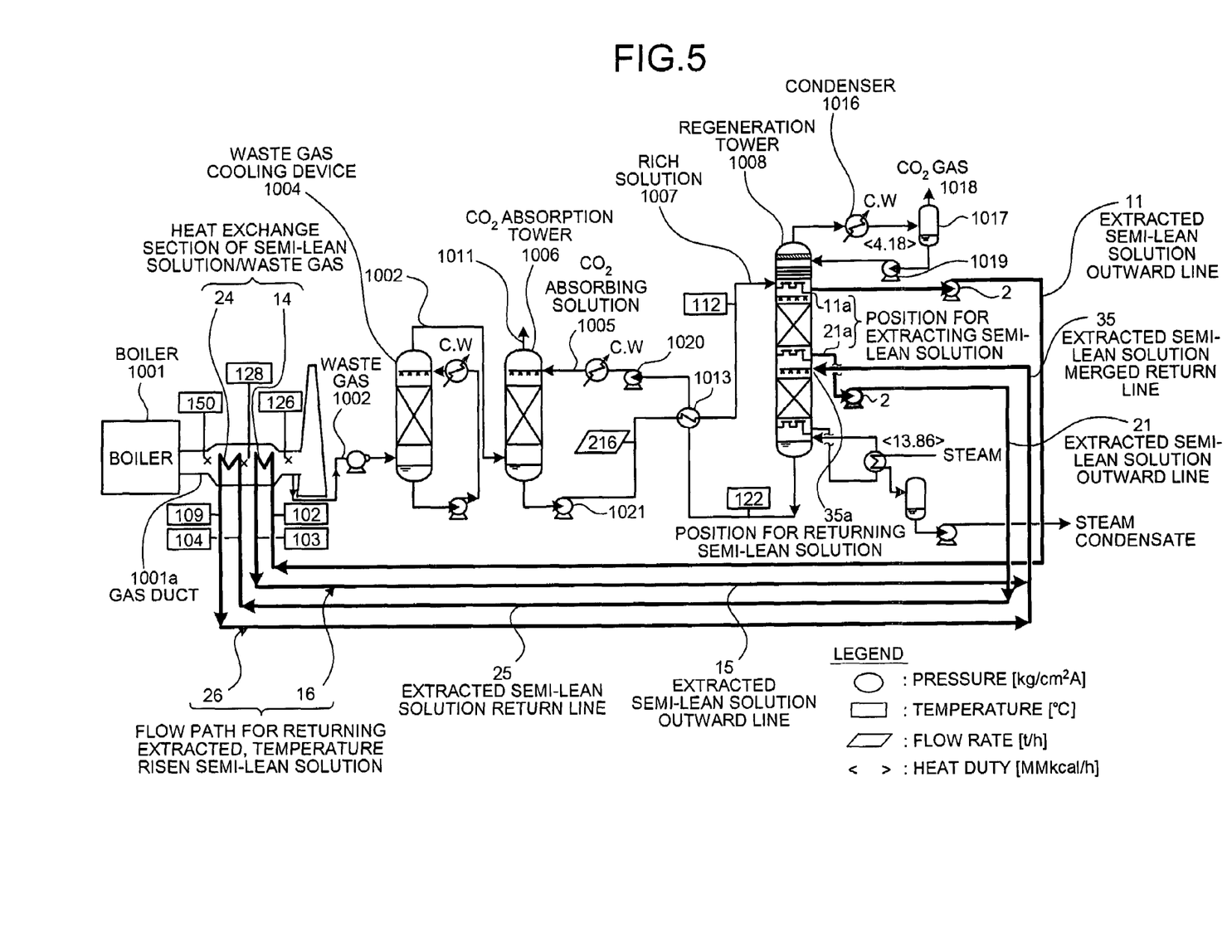
FIG. 5 is a schematic view of a $CO_2$ recovery apparatus according to Example 3 of the present invention.

In the present Example, the number of stages in the regeneration tower 1008 was 13. In FIG. 1, and FIGS. 3 and 5 described later, in order to avoid making the figure cumbersome and complicated, filing chamber layers were depicted as double stage laminates, but in fact, many stages are laminated. In the present Example, the position 1a for extracting the semi-lean solution of a semi-lean solution extracting tube 1 is set in a lower end of the 6th stage.

The semi-lean solution extracting tube 1 attached to the regeneration tower 1008 and having the position 1a for extracting the semi-lean solution in the 6th stage of 13 stages in the regeneration tower 1008 is linked to an extracted semi-lean solution outward line 3 through a semi-lean solvent pump 2. This extracted semi-lean solution outward line 3 enters in the gas duct 1001a of the industrial facility such as boilers and gas turbines, and subsequently is formed into, for example, a helical shape in order to increase a contact area with the waste gas 1002 in the gas duct 1001a. This portion in which the contact area with the waste gas has been increased configures a heat exchange section 4 of semi-lean solution/waste gas. The above outward line 3 extends out of the gas duct 1001a via this heat exchange section 4 of semi-lean solution/waste gas, and then becomes an extracted semi-lean solution return line 5, which returns to the regeneration tower 1008. A semi-lean solution return position 5a at which this extracted semi-lean solution return line 5 is attached to the regeneration tower 1008 is set in an upper end of the 7th stage in the present Example.

In the above configuration, the semi-lean solution extracting tube 1, the extracted semi-lean solution outward line 3, the heat exchange section 4 and the extracted semi-lean solution return line 5 configure a flow path 6 for returning extracted, temperature risen semi-lean solution.

In the present Example, 100% of semi-lean solution present in the upper part of the 6th stage in the regeneration tower 1008 is extracted at the position 1a for extracting the semi-lean solution provided in the 6th stage. The temperature of this extracted semi-lean solution was 104° C., the temperature of the semi-lean solution after passing through the heat exchange section 4 of semi-lean solution/waste gas was raised to 109° C., and the semi-lean solution was returned to the upper part of the 7th stage in the regeneration tower 1008 with keeping this temperature. The temperature of the waste gas 1002 in the gas duct 1001a was lowered from 150° C. to 128° C. by the heat exchange between the semi-lean solution and the waste gas. Cooling energy consumed in the waste gas cooling device 1004 is reduced by this temperature falling. Heat quantity of a reboiler 1014 was reduced from 14.87 MMkcal/hr which was the heat quantity when no heat exchange was performed to 13.94 MMkcal/hr. A heat quantity lowering rate of this reboiler becomes 6.24%.

Figure 2:
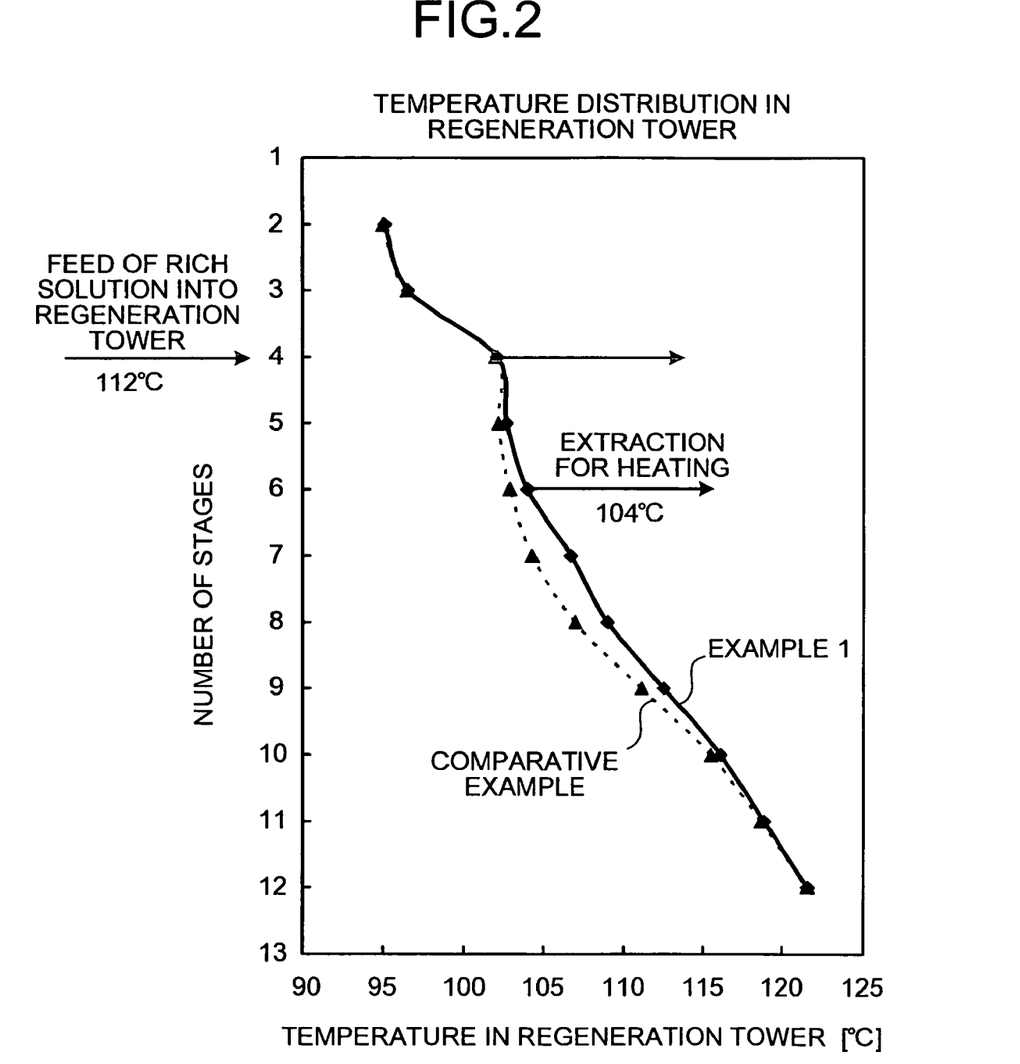
FIG. 2 is a view showing a temperature distribution profile in a regeneration tower in Example 1 of the present invention.

Furthermore, as shown in FIG. 2, the temperature distribution profile in the regeneration tower 1008 is boosted to a high temperature side by returning the semi-lean solution heated to 109° C. to the 7th stage of the regeneration tower 1008. In FIG. 2, a solid line represents the temperature distribution profile in the regeneration tower in the present Example 1, and a dashed line represents the temperature distribution profile in the conventional regeneration tower when the semi-lean solution is neither extracted nor heated. The temperature profile is shifted to the high temperature side in the 4th through 11th stages as shown in the figure by extracting 100% semi-lean solution from the 6th stage, raising its temperature to 109° C. with the waste gas and then returning it to the 7th stage. This shift of temperature distribution to the high temperature side in the middle stages is an effect inherent for the present invention, and can not be obtained by heating using the conventional reboiler 1014.

The temperature distribution profile in the regeneration tower 1008 is shifted to the high temperature side in the middle stages, but the temperature is not raised in the upper stages. As a result, the heat quantity consumed in a condenser 1016 in the present Example is almost the same as in the conventional apparatus.

The results of aforementioned various measurements were listed in Table 1.

EXAMPLE 2

FIG. 3 is a schematic view of a $CO_2$ recovery apparatus in Example 2 according to the present invention. In the figure, the illustration is simplified by giving the same letter and numeral to the same configuration as in the above FIG. 1. This Example 2 is different from Example 1 in that the position 1b for extracting the semi-lean solution in the regeneration tower 1008 was set in the position (4th stage) for infusing the rich solution 1007 into the regeneration tower 1008, the return position 5b of the return line 5 to the regeneration tower 1008 was set in the 6th stage and an amount of the semi-lean solution to be extracted was set as 50%.

In the present Example 2, 50% of the semi-lean solution present in the 4th stage in the regeneration tower 1008 is extracted at the position 1b for extracting the semi-lean solution provided in the 4th stage, which is the position for infusing the rich solution 1007 as described above. The temperature of this extracted semi-lean solution was 103° C., the temperature of the semi-lean solution after passing through the heat exchange section 4 of semi-lean solution/waste gas was raised to 113° C., and then the semi-lean solution was returned to the upper part of the 6th stage in the regeneration tower 1008 with keeping this temperature. The temperature of the waste gas 1002 in the gas duct 1001a was lowered from 150° C. to 126° C. by the heat exchange between the semi-lean solution and the waste gas. The cooling energy consumed in the waste gas cooling device 1004 is reduced by this temperature falling. The heat quantity of the reboiler 1014 was reduced from 14.87 MMkcal/hr which was the heat quantity when no heat exchange was performed to 13.91 MMkcal/hr. The heat quantity lowering rate of this reboiler becomes 6.43%.

Figure 4:
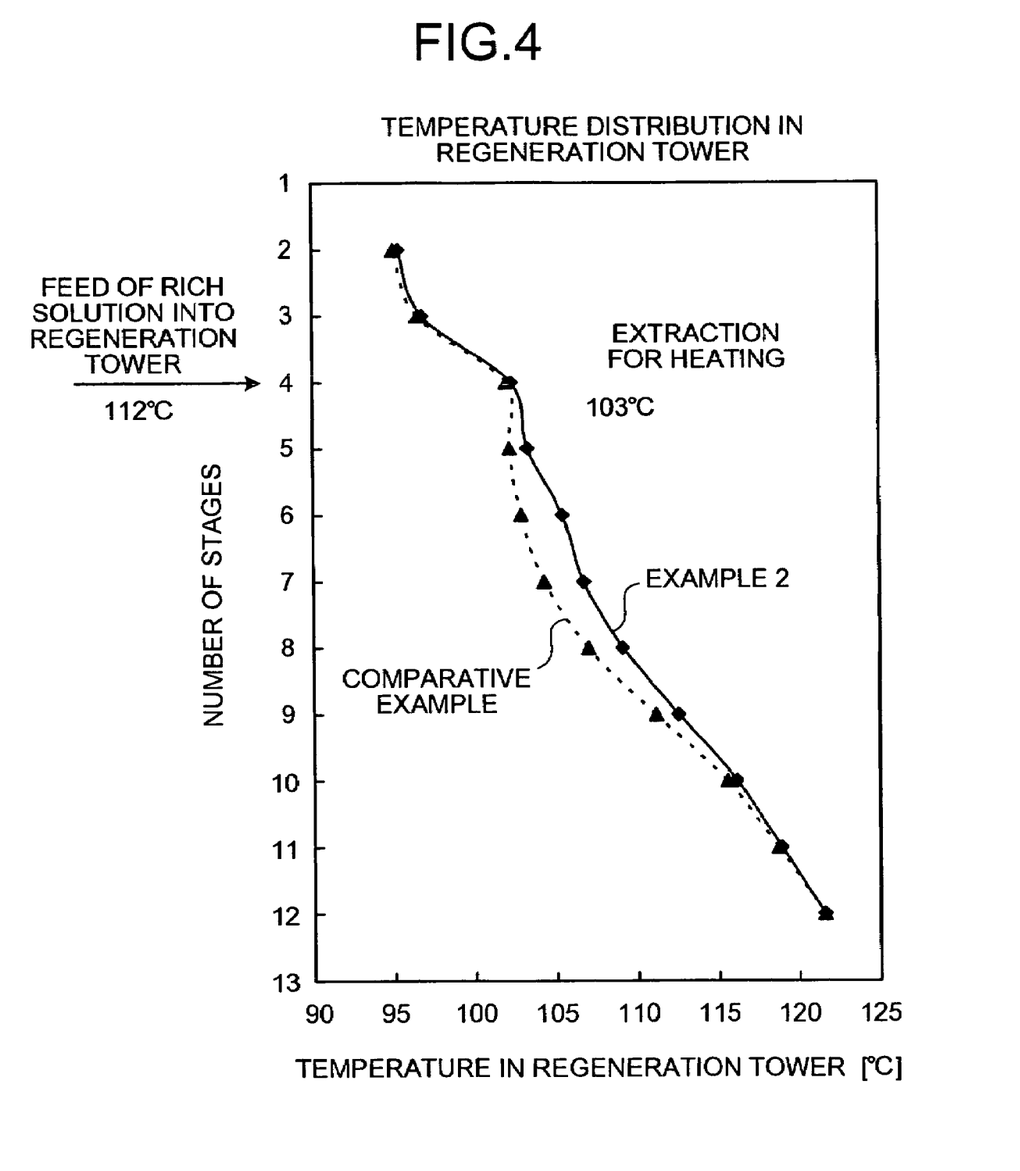
FIG. 4 is a view showing a temperature distribution profile in a regeneration tower in Example 2 of the present invention.

Furthermore, as shown in FIG. 4, the temperature distribution profile in the regeneration tower 1008 is boosted to the high temperature side by returning the semi-lean solution heated to 109° C. to the 6th stage in the regeneration tower 1008. In FIG. 4, the solid line represents the temperature distribution profile in the regeneration tower in the present Example 2, and the dashed line represents the temperature distribution profile in the conventional regeneration tower when the semi-lean solution is neither extracted nor heated. The temperature profile is shifted to the high temperature side mainly in the 4th through 11th stages as shown in the figure by extracting 50% semi-lean solution from the 4th stage, raising its temperature to 109° C. and then returning it to the 6th stage. This shift of temperature distribution to the high temperature side in the middle stages is the effect inherent for the present invention, and can not be obtained by heating using the conventional reboiler 1014.

The temperature distribution profile in the regeneration tower 1008 is shifted to the high temperature side mainly in the middle stages, and the temperature is only slightly raised in the upper stages. As a result, the heat quantity consumed in the condenser 1016 is slightly increased from −4.14 MMkcal/hr (conventional apparatus) to −4.22 MMkcal/hr (this Example) and is approximately the same value.

The results of aforementioned various measurements were listed in Table 1.

EXAMPLE 3

FIG. 5 is a schematic view of a $CO_2$ recovery apparatus in Example 3 according to the present invention. In the figure, the illustration is simplified by giving the same letter and numeral to the same configuration as in the above FIGS. 1 and 3. This Example 3 is different from Example 1 in that the positions for extracting the semi-lean solution in the regeneration tower 1008 are set in two positions (positions 11a and 21a) and the semi-lean solution is returned at one return position 35b in the regeneration tower 1008 by running the return lines 15 and 25 of the flow paths 16 and 26 for returning extracted, temperature risen semi-lean solution together into one return line 35 in a last half.

The position 11a for extracting is located in the 4th stage same as in Example 2, and the position 21a for extracting is located in the 6th stage same as in Example 1. The outward lines 11 and 21 are formed into helical shapes to configure the heat exchange sections 14 and 24 of semi-lean solution/waste gas in the gas duct 1001a, and are linked to the return lines 15 and 25, respectively. The return position 35a at which the return line 35 made by running the return lines 15 and 25 together in the last half is set in the upper part of the 7th stage.

In the present Example 3, the semi-lean solution in the regeneration tower 1008 is extracted from two positions. One position 11a for extracting is set in the upper part of the 4th stage at which the rich solution 1007 is infused as described above. From this position 11a for extracting the semi-lean solution, 50% of the semi-lean solution present in the upper part of the chamber filing layer in the 4th stage in the regeneration tower 1008 is extracted. The temperature of this semi-lean solution is 102° C., the temperature of the semi-lean solution after passing through the heat exchange section 14 of semi-lean solution/waste gas is raised to 103° C., and the semi-lean solution is run in the return line 15 with keeping this temperature.

Another position 21a for extracting the semi-lean solution is set in the upper part of the chamber filling layer in the 6th stage as described above. From this position 21a for extracting the semi-lean solution, 100% of the semi-lean solution present in the upper part of the chamber filing layer in the 6th stage in the regeneration tower 1008 is extracted. The temperature of this semi-lean solution is 104° C., the temperature of the semi-lean solution after passing through the heat exchange section 24 of semi-lean solution/waste gas is raised to 109° C., and the semi-lean solution is run in the return line 25 with keeping this temperature.

The temperatures of the semi-lean solutions which ran in the return lines 15 and 25 were raised to 103° C. and 109° C., respectively, the semi-lean solutions were run together into the return line 35, and returned to the upper part of the chamber filling layer in the 7th stage in the regeneration tower 1008. In the heat exchange between the waste gas and the two semi-lean solutions, the temperature of the waste gas 1002 in the gas duct 1001a was lowered from 150° C. to 128° C. by passing through the heat exchange section 24 of semi-lean solution/waste gas, and further lowered from 128° C. to 126° C. by passing through the heat exchange section 14 of semi-lean solution/waste gas. The cooling energy consumed in the waste gas cooling device 1004 is reduced by this temperature falling. The heat quantity of the reboiler 1014 was reduced from 14.87 MMkcal/hr which was the heat quantity when no heat exchange was performed to 13.86 MMkcal/hr. The heat quantity lowering rate of the reboiler becomes 6.77%.

Figure 6:
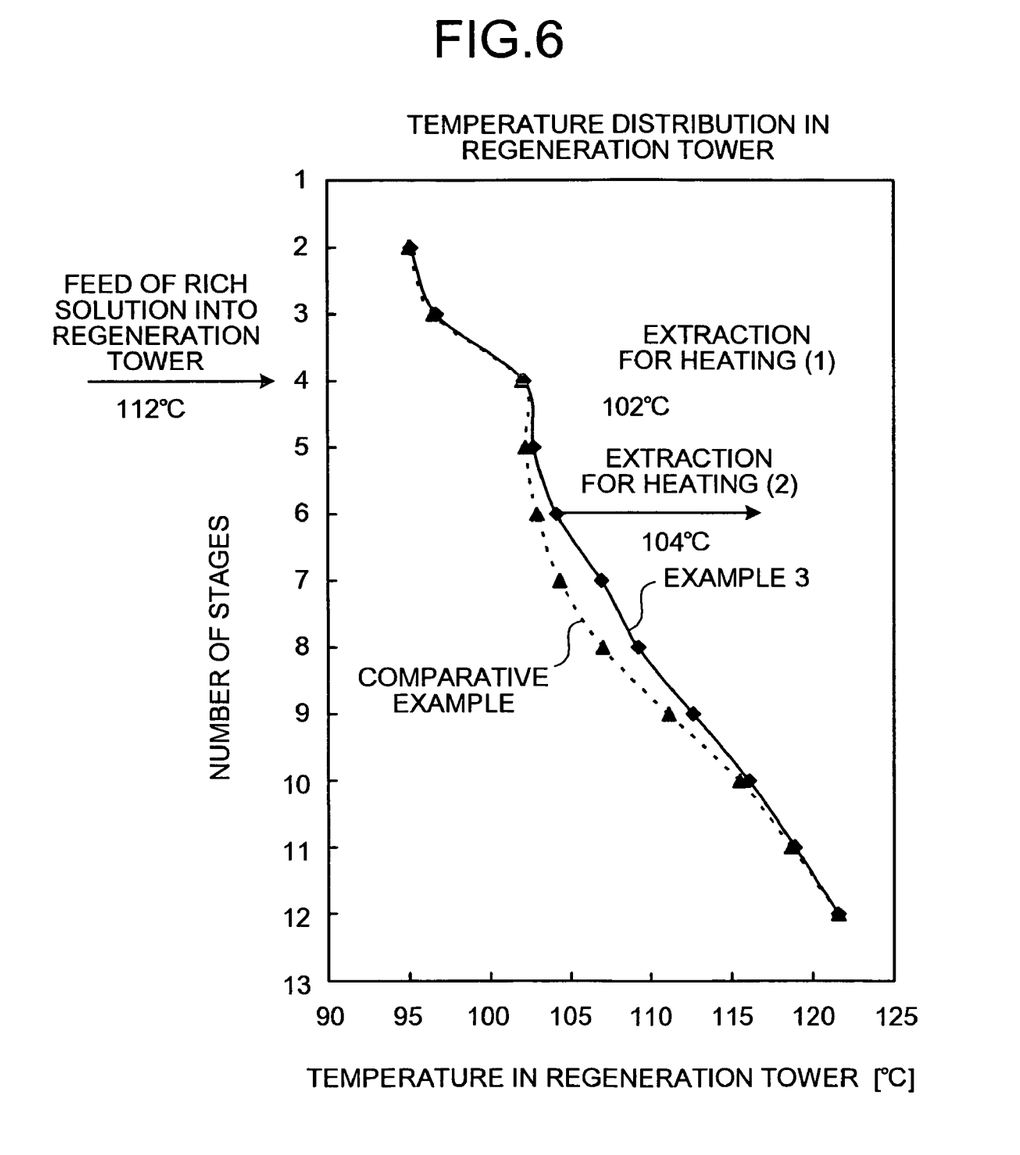
FIG. 6 is a view showing a temperature distribution profile in a regeneration tower in Example 3 of the present invention.

Furthermore, as shown in FIG. 6, the temperature distribution profile in the regeneration tower 1008 is boosted to the high temperature side by returning the heated semi-lean solution to the 7th stage of the regeneration tower 1008. In FIG. 6, the solid line represents the temperature distribution profile in the regeneration tower in the present Example 3, and the dashed line represents the temperature distribution profile in the conventional regeneration tower when the semi-lean solution is neither extracted nor heated. It was confirmed as shown in the figure that the temperature profile was shifted to the high temperature side mainly in the 4th stage through the 11th stage by running the semi-lean solution obtained by extracting 50% of semi-lean solution from the upper part of the chamber filling layer in the 4th stage at which the rich solution was infused and raising its temperature to 103° C. with the waste gas, together with the semi-lean solution obtained by extracting from the upper part of the filling layer in the 6th stage and raising its temperature to 109° C. with the waste gas, and then returning to the 7th stage. This shift of temperature distribution profile to the high temperature side in the middle stages is the effect inherent for the present invention, and can not be obtained by heating using the conventional reboiler 1014.

The temperature distribution profile in the regeneration tower 1008 is shifted to the high temperature side mainly in the middle stages, and the temperature is only slightly raised in the upper stages. As a result, the heat quantity consumed in the condenser 1016 is slightly increased from −4.14 MMkcal/hr (conventional apparatus) to −4.18 MMkcal/hr (this Example) and is approximately the same value.

The results of aforementioned various measurements were listed in Table 1.

In the present Example 3, the semi-lean solution in the regeneration tower is extracted from two positions, and after the heat exchange with the waste gas, returned at one position in the regeneration tower, however after the heat exchange with the waste gas, two semi-lean solutions need not be run together and may be returned separately to the regeneration tower.

TABLE 1

|  |  | Heat quantity in reboiler MMkcal/hr | Heat quantity in condenser MMkcal/hr | Heat quantity lowering rate in reboiler % | Temperature of waste gas ° C. | Temperature of extracted amine ° C. |
|---|---|---|---|---|---|---|
| Comparative example | No extraction | 14.87 | −4.14 | — | — | — |
| Example 1 | 100% Extraction at 6th stage → return at 7th stage | 13.94 | −4.17 | 6.24 | 150.0 → 128.2 | 104.2 → 109.1 |
| Example 2 | 50% Extraction at feed stage → return at 6th stage | 13.91 | −4.22 | 6.43 | 150.0 → 126.4 | 102.5 → 113.1 |
| Example 3 | 50% Extraction at feed stage → return at 7th stage | 13.86 | −4.18 | 6.77 | 128.3 → 126.3 | 102.3 → 103.2 |
|  | 100% Extraction at 6th stage → return at 7th stage |  |  |  | 150.0 → 128.3 | 104.3 → 109.2 |

As is evident from the above Examples, by the constitution of the present invention that at least a part of the semi-lean solution is extracted from the regeneration tower 1008, its temperature is raised with the remaining heat of the waste gas and the semi-lean solution is returned to the regeneration tower 1008 again, it is possible to (i) reduce the cooling energy in the waste gas cooling device 1004, (ii) boost the temperature profile in the middle stages in the regeneration tower to the high temperature side to increase the regeneration efficiency, and (iii) reduce the consumed heat quantity in the reboiler which heats the bottom of the regeneration tower in order to keep the regeneration efficiency.

As described above, according to the present invention, it is possible to provide the apparatus and the method for recovering $CO_2$ in which the energy efficiency is further enhanced.

What is claimed is:

1. A $CO_2$ recovery apparatus comprising:
   a $CO_2$ absorption tower for removing $CO_2$ from a waste gas containing $CO_2$ discharged from industrial facilities by contacting the waste gas with a $CO_2$ absorbing solution for absorbing $CO_2$;
   a regeneration tower for regenerating a rich solution which is a $CO_2$ absorbing solution and absorbed $CO_2$ into a lean solution which is a $CO_2$ absorbing solution and absorbed no $CO_2$ by removing $CO_2$ from the rich solution, wherein the lean solution obtained by removing $CO_2$ in a regeneration tower is reutilized as a $CO_2$ absorbing solution in an absorption tower; and
   a flow path for returning extracted, temperature risen semi-lean solution to the regeneration tower wherein at least a part of the semi-lean solution obtained by removing a partial $CO_2$ from the rich solution infused in the regeneration tower from an upper part of the regeneration tower is extracted, raised its temperature by heat exchanging with a high-temperature waste gas in a gas duct of the industrial facility, and then returned to the regeneration tower.

2. The $CO_2$ recovery apparatus according to claim 1, wherein a return position of the flow path for returning extracted, temperature risen semi-lean solution is set below a position for extracting the semi-lean solution in the regeneration tower.

3. The $CO_2$ recovery apparatus according to claim 1, wherein a position for extracting the semi-lean solution in the regeneration tower is an optional position between a position close to the infusion position of the rich solution and a middle stage of the regeneration tower.

4. The $CO_2$ recovery apparatus according to claim 1, wherein multiple positions for extracting the semi-lean solution are provided in the regeneration tower, and a return position of the extracted semi-lean solutions to the regeneration tower after heat exchanged with the waste gas is one position or multiple positions equal to or less than a number of the positions for extracting.

5. A $CO_2$ recovery apparatus comprising:
   a $CO_2$ absorption tower for absorbing $CO_2$ into a $CO_2$ absorbing solution by contacting the $CO_2$ absorbing solution with combustion waste gas extracted from a gas duct;
   a regeneration tower for removing $CO_2$ from the $CO_2$ absorbing solution by heating the $CO_2$ absorbing solution;
   a waste gas heat exchange section provided in the gas duct;
   an outward line of an extracted semi-lean solution for extracting the $CO_2$ absorbing solution from the regeneration tower and transferring it to the waste gas heat exchange section; and
   a return line of the extracted semi-lean solution for transferring the $CO_2$ absorbing solution from the waste gas heat exchange section to the regeneration tower, wherein a heat of the combustion waste gas is utilized by heat exchanging the $CO_2$ absorbing solution with the combustion waste gas in the waste gas heat exchange section when a lean solution is made by removing $CO_2$ from a rich solution which is the $CO_2$ absorbing solution and absorbed $CO_2$.

6. A method for recovering $CO_2$ comprising the steps of:

removing $CO_2$ from a waste gas containing $CO_2$ discharged from industrial facilities by contacting the waste gas with a $CO_2$ absorbing solution in a $CO_2$ absorption tower;

regenerating a rich solution which is the $CO_2$ absorbing solution and absorbed $CO_2$ into a lean solution which is the $CO_2$ absorbing solution and absorbed no $CO_2$ by introducing the rich solution into a regeneration tower and removing $CO_2$ from the rich solution, thereby reutilizing the lean solution as the $CO_2$ absorbing solution in the absorption tower;

extracting at least a part of a semi-lean solution obtained by removing a part or a majority of $CO_2$ from the rich solution infused into the regeneration tower from an upper part of the regeneration tower;

raising a temperature of the semi-lean solution by heat exchanging with a high-temperature waste gas in a gas duct of the industrial facility and a gas turbine; and returning the semi-lean solution into the regeneration tower at a position below a position for extracting the semi-lean solution in the regeneration tower.

7. The method for recovering $CO_2$ according to claim 6, wherein the semi-lean solution is extracted at an optional position between a position close to the infusion position of the rich solution and a middle stage of the regeneration tower.

8. The method for recovering $CO_2$ according to claim 6, wherein the semi-lean solution is extracted at multiple positions in the regeneration tower, the semi-lean solutions extracted at multiple positions are heat exchanged with the waste gas, and then these solutions are returned to one position or multiple positions equal to or less than a number of the positions for extracting in the regeneration tower.

* * * * *